US00RE38738E

(19) United States
(12) Reissued Patent
Serres et al.

(10) Patent Number: US RE38,738 E
(45) Date of Reissued Patent: May 31, 2005

(54) CYLINDRICAL SCREEN, PARTICULARLY FOR PAPER PULP

(75) Inventors: Alain Serres, Reims (FR); Alain Fernandez de Grado, Vitry le Francois (FR)

(73) Assignee: Kadant Lamort, Vitry le (FR)

(21) Appl. No.: 10/140,205

(22) Filed: May 8, 2002

Related U.S. Patent Documents

Reissue of:
(64) Patent No.: 6,338,412
Issued: Jan. 15, 2002
Appl. No.: 09/587,329
Filed: Jun. 5, 2000

(30) Foreign Application Priority Data

Jun. 4, 1999 (FR) ..... 99 07070

(51) Int. Cl.[7] ..... B21D 5/02; B21D 5/16; B07B 1/20; B07B 1/46

(52) U.S. Cl. ..... 210/415; 210/497.01; 209/250; 209/273; 209/306; 209/395; 162/55

(58) Field of Search ..... 210/415, 497.01, 210/484, 485; 209/250, 273, 306, 395; 162/55

(56) References Cited

U.S. PATENT DOCUMENTS 5,118,421 A * 6/1992 Scarano ..... 210/485
5,626,235 A * 5/1997 Aikawa ..... 209/395
5,697,503 A * 12/1997 Serres ..... 209/407
5,791,495 A * 8/1998 Gero et al. ..... 209/395
5,804,075 A * 9/1998 Aikawa ..... 210/497.01
5,954,956 A * 9/1999 Lutz et al. ..... 210/232
6,056,126 A * 5/2000 Schabel et al. ..... 209/406

FOREIGN PATENT DOCUMENTS

| | | | |
|---|---|---|---|
| DE | 196 51 643 A1 | | 6/1998 |
| EP | 0 707 109 A1 | | 4/1996 |
| EP | 0 893 536 A3 | | 5/1999 |
| WO | WO 86/34045 | | 9/1997 |
| WO | 00/15901 | * | 3/2000 |

* cited by examiner

*Primary Examiner*—Thomas M. Lithgow
(74) *Attorney, Agent, or Firm*—Nixon & Vanderhye, P.C.; Frank P. Presta

(57) ABSTRACT

Cylindrical screen, particularly for paper pulp, of the type comprising at least one filtering element (10) positioned between two flanges (1, 2) by means of a number of bars (3). The filtering element is composed by wires (10) placed side by side and held by rings (11). This filtering element is rigid in the axial direction and is placed upstream from the above mentioned bars (3), in relation to the direction of flow of the pulp. The filtering element is held against the bars (3) through the rings (11) that are in contact with the bars without being attached to them, so as to maintain its shape by withstanding the pressure exerted by the pulp.

10 Claims, 2 Drawing Sheets

CYLINDRICAL SCREEN, PARTICULARLY FOR PAPER PULP

Matter enclosed in heavy brackets [ ] appears in the original patent but forms no part of this reissue specification; matter printed in italics indicates the additions made by reissue.

FIELD OF THE INVENTION

The invention described herein relates to a cylindrical screen designed in particular for the treatment of paper pulp.

BACKGROUND OF THE INVENTION

In patent WO97/34045 a cylindrical screen for paper pulp was described, in which the filtering elements were tightened between two flanges. The filtering elements were held in position by means of beveled ends, which were fitted into grooves that were also beveled.

The implementation of this arrangement is time-consuming.

In patent EP 0 707 109 a cylindrical screen was described which was composed of overlaying of U-shaped rings, and these rings were secured between two flanges by means of a number of ties. The screen in question was thus prestressed due to the elasticity of the U-shaped rings.

The document DE 196 51 643 describes a filtering screen composed of rods placed in a cage constituted by two flanges connected to each other by bars forming ties. The wires are tightened between the flanges and connected to the bars by support rings that at their external edge are welded to the bars and that at their internal edge are provided with recesses receiving rods having complementary forms. The bars can thus be mounted in the support rings and extracted therefrom when taking away one of the flanges so as to have access to the bars. However, this screen has a fixed support structure in which the support rings are welded onto the bars while respecting the exact alignment of the recesses from one ring to an other. Thus, the mounting of this support structure is relatively complicated and consequently expensive.

An other screen for paper pulp is known from FP 0 893 536. This screen comprises a cage composed by two end flanges and one intermediate support ring that are connected to each other by ties formed by bars extending through these three elements. The bars have threaded ends cooperating with nuts placed on the external surfaces of the flanges. The filtering element is constituted by two metal sheets having openings and which are mounted in circular recesses circular recesses carried out on the internal surfaces of the flanges and on one side and the other of the support ring. Thus, this screen requires a machining of the flanges and also of the intermediate support ring.

The purpose of the present invention is to propose a screen that is more simple to produce and thus less expensive than the screens of prior art. The screen according to the invention is particularly meant to avoid welding between the bars and the support rings as in DE 196 51 643, and to avoid the machining of the intermediate ring and of the flanges as in FP 0 893 536.

The present invention further permits fabrication of screens having filtering elements composed of appropriately dimensioned wires assembled side by side attached to a bearing element instead of the U-shaped rings in patent EP 0 707 109.

SUMMARY OF THE INVENTION

The screen in the present invention, is of a type composed of one or several filtering elements held between two flanges by means of a number of bars and the filtering element may be constituted by means of assembly on regularly spaced parallel wire supports, positioned side by side with a slight space between them.

Thus, such a filtering element is axially rigid and positioned upstream from the bars in relation to the direction of flow of the pulp and is held against the bars by the wire supports so as to he held in shape by the bars in order to withstand the pressure exerted by the pulp.

The subject matter of the invention is a cylindrical screen, particularly for paper pulp, of the type comprising at least two flanges connected to each other by means of a number of bars, and at least one thin filtering element rigid in the axial direction, said filtering element being held by support rings and placed upstream from the above mentioned bars, in relation to the direction of flow of the pulp. The filtering element is held against the bars through die support rings that are in contact with the bars, without being attached to them.

In one embodiment, the bars are attached to the flanges by being held against them so that the distance between the two flanges is invariable, which may necessitate the use of thickness adjusting shims to compensate for the errors in the dimensions of the filtering elements.

In an other embodiment, the bars are attached to and held against one flange, and pass through the other, so that the filtering elements can be secured by the second flange.

According to other features of the invention:

- the screen furthermore comprises at least one strengthening ring placed between two filtering elements following one after the other so as to receive the bars and fixe them together in order to prevent bending of the same;
- the bars are attached to the two flanges and are held against the flanges, abutting in arrangements so that the distance between the two flanges is invariable;
- thickness adjustment shims are interpositioned between the filtering element and one or other of the flanges;
- the support rings are at an internal or external edge thereof welded to the filtering element, whereas at an other edge, they are in contact with the bar;
- a distance of about 25 mm is arranged between two support rings placed one after the other.

BRIEF DESCRIPTION OF THE DRAWINGS

By way of non-limitative example and in order to aid understanding of the invention the appended drawings show the following.

DESCRIPTION OF PREFERRED EMBODIMENTS

Figure 1:
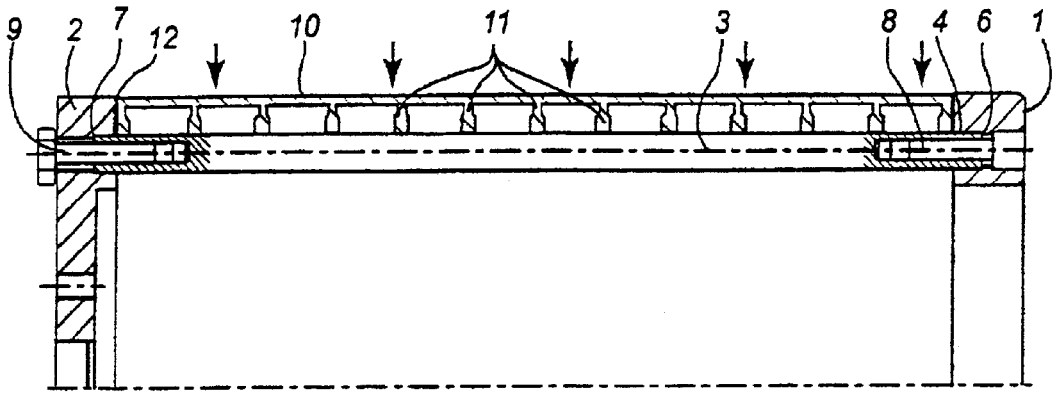
FIG. 1: a half view, longitudinal section, of the first embodiment of the invention with a centripetal screen.

By referring to FIG. 1, one can see that the screen is constructed by assembly at fixed dimensions of two circular flanges 1 and 2 by means of a number of bars 3.

The ends 4 and 5 of each bar 3 are inserted against the bottom of the arrangements 6 and 7 made in the flanges 1 and 2 and the bars are attached to these flanges by screws 8 and 9.

Figure 2:
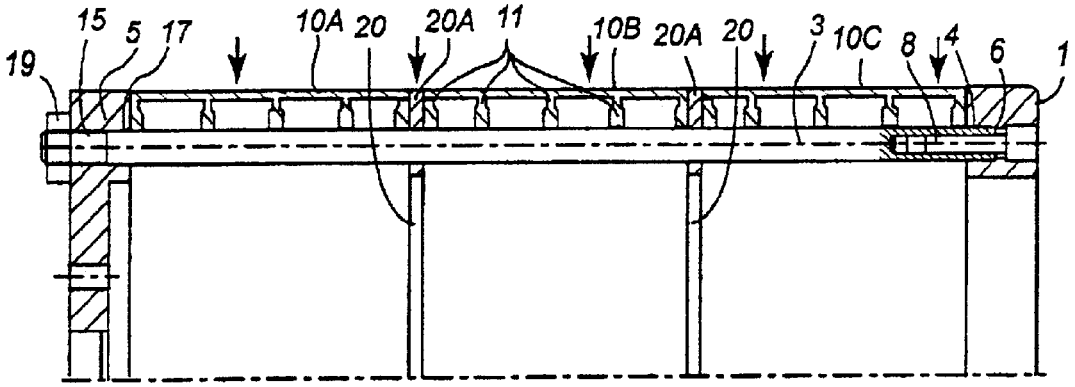
FIG. 2: a half view, longitudinal section of the second embodiment of the invention with a centripetal screen.

As a result the dimensions of the cage formed in this manner are invariable, and this is sometimes vital for the installation of the screen in certain equipment. This cage receives the filtering element 10 that in the centripetal embodiment illustrated in FIGS. 1 and 2 is disposed on the periphery of the cage, and that in the centrifugal embodiment illustrated in FIGS. 3 and 4 is disposed inside the cage.

The filtering element is made up of wires 10 placed side by side and being parallel to the cylinder generator. The wires are held by supports, which are composed of rings 11, perpendicular to the wires 10, at regular distance from each other. During fabrication procedure, the wires are fixed to the rings 11 by welding so as to define filtration openings between the wires.

Figure 3:
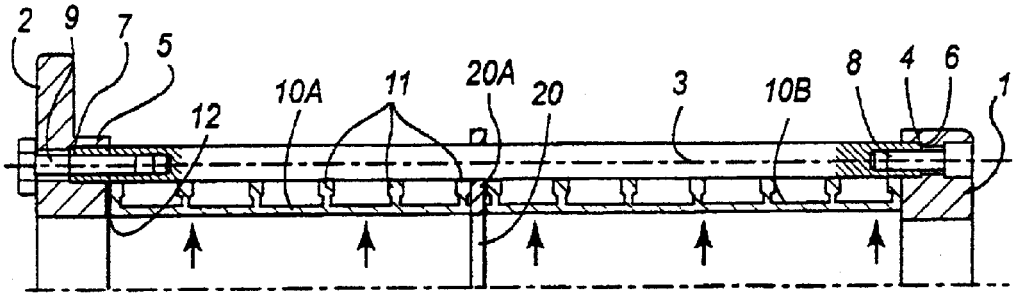
FIG. 3: a view corresponding to FIG. 1, centrifugal version
Figure 4:
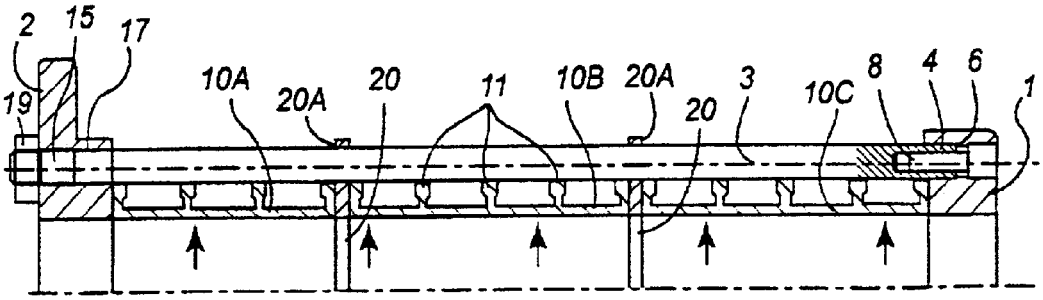
FIG. 4: a view corresponding to FIG. 2, centrifugal version
Figure 5:
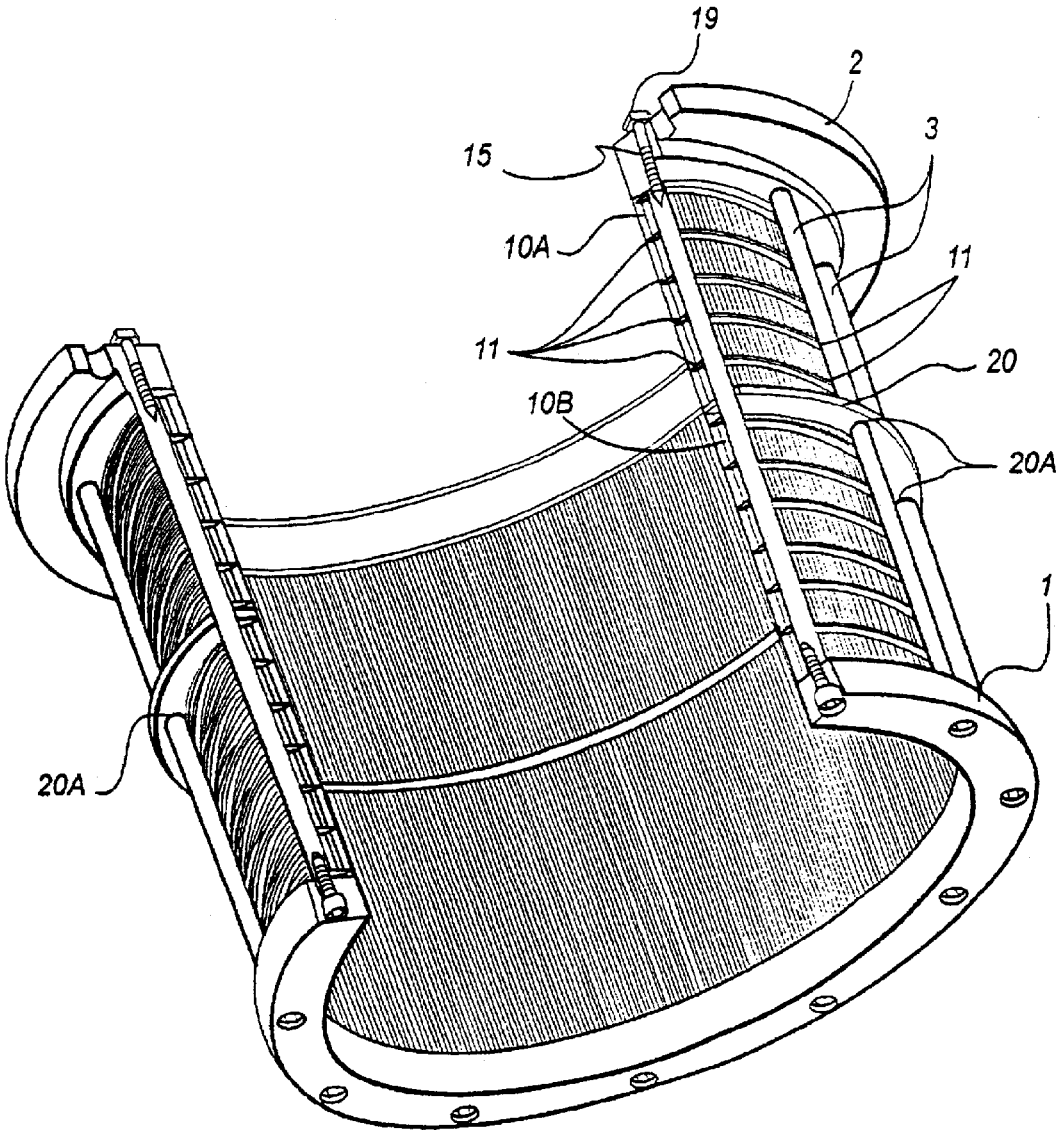
FIG. 5 a view in perspective of the screen in FIG. 3 with partical cut-away.

The thus obtained assembly is then, in the embodiment illustrated in FIGS. 3–5, simply introduced into the cage so as to bring the rings 11 into contact with the bars 3, which results in a floating mounting between the rings and the bars. Then the wires are lightened between the flanges. The mounting for the centripetal embodiment corresponds to the described mounting, but in this case the assembly is placed around the cage.

The supports 11 remain in contact with the bars 3, to enable the filtering element to withstand the pressure exerted by the pulp, because the filtering element is as a matter of fact held against the bars through the support rings. The optimal distance between two rings following on each other is about 25 mm, which means that the number of rings is function of the total length of the filtering element.

The screen operates in centripetal mode, that is, the flow of pulp takes place from the outside toward the inside, the bars 3 are, as already mentioned, inside the filtering element in such a way as to act as a support. In other words, the filtering element is upstream from the bars 3 in relation to the direction of flow of the pulp.

As it is possible for the length of the filtering element not to correspond exactly to the distance between the two flanges 1 and 2, which is invariable, provision has been made for the installation of thickness adjustment shims as shown 12 between the end of the cylinder and one or other of the flanges 1 or 2.

FIG. 2 shows an alternative construction to the centripetal screen in FIG. 1, the same elements are referenced in the same way. In contrast to FIG. 1, the screen comprises three filtering elements 10A, 10B and 10C that are placed one after the other with interposition of strengthening rings 20, which support the bars 3 so as to avoid bending thereof.

Each strengthening ring 20 comprises a certain number of holes 20A for receiving the bars 3 and consequently, the number of holes correspond to the number of bars. Each strengthening ring 20 is a separate element that is place directly onto a filtering element so as to let the bars 3 pass through the holes 20A before mounting the following filtering element. The strengthening ring 20 has a sole function to connect the bars to each other so as to rigidify them together.

Furthermore, in this variant, one of the ends 15 of the bars 3 passes through the orifices 17 in flange 2. These bar ends 3 are threaded, so that it is possible to tighten the flange 2 and therefore hold the filtering element 10 in position by tightening between the flanges.

As shown in FIG. 2 it is also possible to position strengthening rings 20 between the two flanges 1 and 2, which support the bars 3 in order to prevent bending.

FIGS. 3 to 5 show the application of the invention to centrifugal screens, that is, screens in which pulp flows from the inside of the screen towards the outside.

In these figures all elements which are identical to those in FIGS. 1 and 2 are referenced in the same way.

The main difference stems from the fact that in FIGS. 1 and 2 the bars 3 are inside the filtering element 10 so as to hold it in position, in FIGS. 3 and 5, it is on the outside.

In FIGS. 3 and 5 that show the same disposition of the elements, two filtering elements 10A and 10B are used and consequently, only one strengthening ring 20 is needed. More precisely the number of strengthening ring 20 is directly function of the number of filtering elements and is would e. g. be possible to produce a screen comprising five filtering elements and consequently four strengthening rings.

In the examples shown in FIGS. 1 to 5, the filtering element is composed of an assembly of wires 10 on supports 11; but the invention is not limited to this particular type of a thin filtering element.

What is claimed is:

1. A cylindrical screen, particularly for paper pulp, of the type comprising at least two flanges (1,2) connected to each other by means of bars (3), and at least one thin filtering element (10) rigid in the axial direction, said filtering element being held by support rings (11) and placed upstream from the above mentioned bars (3), in relation to the direction of flow of the pulp, wherein said filter element (10) is made up of wires placed side by side and being parallel in a cylindrical configuration, and the support rings (11) are at an internal or external edge thereof welded to the filtering element (1), whereas at the other edge thereof, they are in contact with the bars (3), without being attached to them, in a floating mounting between the rings and the bars.

2. The screen as claimed in claim 1, wherein the screen furthermore comprises at least one strengthening ring (20) placed between two filtering elements (10A, 10B, 10C) following one after the other so as to receive the bars (3) and fixe them together in order to prevent bending of the same.

3. The screen as claimed in claim 1, wherein the bars (3) are attached to the two flanges (1, 2) and are held against the flanges, abutting in arrangements (6, 7) so that the distance between the two flanges is invariable.

4. The screen as claimed in claim 3, wherein thickness adjustment shims (12) are interpositioned between the filtering element (10) and one or other of said flanges (1, 2).

5. The screen as claimed in claim 1, wherein a distance of about 25 mm is arranged between two support rings (11) that are placed one after the other.

*6. A cylindrical screen, particularly for paper pulp, of the type comprising at least two flanges (1, 2) connected to each other by means of bars (3), and at least one thin filtering element (10) rigid in the axial direction, said filtering element being held by support rings (11) and placed upstream from the above mentioned bars (3), in relation to the direction of flow of the pulp, wherein said filter element (10) is made up of wires placed side by side and being parallel in a cylindrical configuration, and the support rings (11) are at an internal or external edge thereof attached to the filtering element (1), whereas at the other edge thereof, they are in contact with the bars (3), without being attached to them, in a floating mounting between the rings and the bars.*

*7. The screen as claimed in claim 6, wherein the screen furthermore comprises at least one strengthening ring (20) placed between two filtering elements (10A, 10B, 10C) following one after the other so as to receive the bars (3) and fix them together in order to prevent bending of the same.*

*8. The screen as claimed in claim 6, wherein the bars (3) are attached to the two flanges (1, 2) and are held against the flanges, abutting in arrangements (6, 7) so that the distance between the two flanges is invariable.*

*9. The screen as claimed in claim 8, wherein thickness adjustment shims (12) are interpositioned between the filtering elements (10) and one or other of said flanges (1, 2).*

*10. The screen as claimed in claim 6, wherein a distance of about 25 mm is arranged between two support rings (11) that are placed one after the other.*

* * * * *